US010996879B2

(12) United States Patent
Gokam

(10) Patent No.: US 10,996,879 B2
(45) Date of Patent: *May 4, 2021

(54) LOCALITY-BASED LOAD BALANCING OF INPUT-OUTPUT PATHS

(71) Applicant: EMC IP Holding Company LLC, Hopkinton, MA (US)

(72) Inventor: Kurumurthy Gokam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/401,927

(22) Filed: May 2, 2019

(65) Prior Publication Data
US 2020/0348869 A1 Nov. 5, 2020

(51) Int. Cl.
G06F 3/06 (2006.01)
H04L 12/935 (2013.01)
G06F 13/16 (2006.01)

(52) U.S. Cl.
CPC .......... G06F 3/0635 (2013.01); G06F 3/0604 (2013.01); G06F 3/067 (2013.01); G06F 13/1642 (2013.01); H04L 49/30 (2013.01)

(58) Field of Classification Search
CPC .. G06F 13/1642; G06F 3/0635; G06F 3/0604; G06F 3/067; H04L 49/30
USPC .......................................................... 710/38
See application file for complete search history.

(56) References Cited

U.S. PATENT DOCUMENTS

| 6,687,746 | B1 | 2/2004 | Shuster et al. |
| 6,697,875 | B1 | 2/2004 | Wilson |
| 7,454,437 | B1 | 11/2008 | Lavallee et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,904,681 | B1 | 3/2011 | Bappe et al. |
| 7,925,872 | B2 | 4/2011 | Lai et al. |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

Primary Examiner — Henry Tsai
Assistant Examiner — Aurangzeb Hassan
(74) Attorney, Agent, or Firm — Ryan, Mason & Lewis, LLP

(57) ABSTRACT

An apparatus in one embodiment comprises a host device configured to communicate over a network with a storage system. The host device comprises a plurality of nodes each comprising a plurality of processing devices and at least one communication adapter. The host device further comprises a multi-path input-output (MPIO) driver that is configured to obtain an input-output (IO) operation that targets a given logical volume and to identify a source node for the IO operation. The MPIO driver identifies a plurality of paths between the source node and the given logical volume via the communication adapters of the plurality of nodes and determines locality information for each identified path. The MPIO driver is further configured to select a target path from the identified paths based at least in part on the determined locality information and to deliver the obtained IO operation to the given logical volume via the selected target path.

20 Claims, 3 Drawing Sheets

(56) References Cited

U.S. PATENT DOCUMENTS

| | | | | |
|---|---|---|---|---|
| 8,874,746 B1* | 10/2014 | Gonzalez | ............... | G06F 3/067 |
| | | | | 709/226 |
| 9,400,611 B1 | 7/2016 | Raizen | | |
| 9,594,780 B1 | 3/2017 | Esposito et al. | | |
| 9,778,852 B1 | 10/2017 | Marshak et al. | | |
| 9,946,485 B1* | 4/2018 | Don | ............... | G06F 11/2048 |
| 2004/0010563 A1 | 1/2004 | Forte et al. | | |
| 2005/0080982 A1* | 4/2005 | Vasilevsky | ............... | G06F 9/50 |
| | | | | 711/1 |
| 2008/0043973 A1 | 2/2008 | Lai et al. | | |
| 2009/0327798 A1* | 12/2009 | D'Amato | ............... | H04L 69/40 |
| | | | | 714/4.1 |
| 2010/0077249 A1* | 3/2010 | Das | ............... | G06F 11/2033 |
| | | | | 714/4.1 |
| 2010/0228819 A1* | 9/2010 | Wei | ............... | H04L 67/1095 |
| | | | | 709/203 |
| 2011/0197027 A1 | 8/2011 | Balasubramanian et al. | | |
| 2012/0151095 A1* | 6/2012 | Cyr | ............... | G06F 3/0622 |
| | | | | 710/5 |
| 2015/0169415 A1* | 6/2015 | Hildebrand | ............... | G06F 3/0617 |
| | | | | 714/4.5 |
| 2016/0117113 A1* | 4/2016 | Li | ............... | G06F 3/067 |
| | | | | 711/112 |
| 2016/0231948 A1* | 8/2016 | Gupta | ............... | G06F 3/067 |
| 2018/0157677 A1* | 6/2018 | Bafna | ............... | G06F 3/064 |
| 2018/0275919 A1* | 9/2018 | Chirumamilla | ............... | G06F 3/067 |
| 2019/0042144 A1* | 2/2019 | Peterson | ............... | G06F 3/067 |
| 2019/0391890 A1* | 12/2019 | Swamy | ............... | G06F 11/2074 |
| 2020/0026425 A1* | 1/2020 | Memon | ............... | H04L 67/10 |
| 2020/0226145 A1* | 7/2020 | Meiri | ............... | G06F 3/067 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. filed Dec. 21, 2017 and entitled "Storage System with Input-Output Performance Control Utilizing Application Process Detection."

* cited by examiner

LOCALITY-BASED LOAD BALANCING OF INPUT-OUTPUT PATHS

FIELD

The field relates generally to information processing systems, and more particularly to storage in information processing systems.

BACKGROUND

Storage arrays and other types of storage systems are often shared by multiple host devices over a network. A given host device may comprise a multi-path input-output (MPIO) driver that is configured to process input-output (IO) operations for delivery from the given host device to the storage system. In some cases, the host devices may implement a non-uniform memory access (NUMA) architecture, combining groups of processing devices, memory and hardware bus adapters (HBAs) into separate nodes which enhances processing and latency within a given node. Utilizing existing multi-pathing techniques with host devices implementing a NUMA architecture may result in various inefficiencies in the storage system.

SUMMARY

Illustrative embodiments of the present invention provide techniques for what is referred to herein as "locality-based pathing." For example, some embodiments provide locality-based load balancing of IO paths in multi-pathing software. Other types of locality-based pathing can be implemented in other embodiments.

In one embodiment, an apparatus comprises a host device configured to communicate over a network with a storage system comprising a plurality of storage devices. The host device comprises a plurality of nodes each comprising a plurality of processing devices, memory coupled to the plurality of processing devices, and at least one communication adapter. Each node is connected to at least one adjacent node by an interconnect communication pathway. The host device further comprises an MPIO driver that is configured to deliver input-output operations from the host device to the storage system over the network. The MPIO driver is further configured to obtain an input-output operation that targets a given logical volume of the storage system and identify a source node among the plurality of nodes for the input-output operation based at least in part on information associated with the input-output operation. The MPIO driver identifies a plurality of paths between the source node and the given logical volume via the communication adapters of the plurality of nodes and determines locality information for each identified path. The MPIO driver is further configured to select a target path from the identified paths based at least in part on the determined locality information for each identified path and to deliver the obtained input-output operation to the given logical volume via the selected target path.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
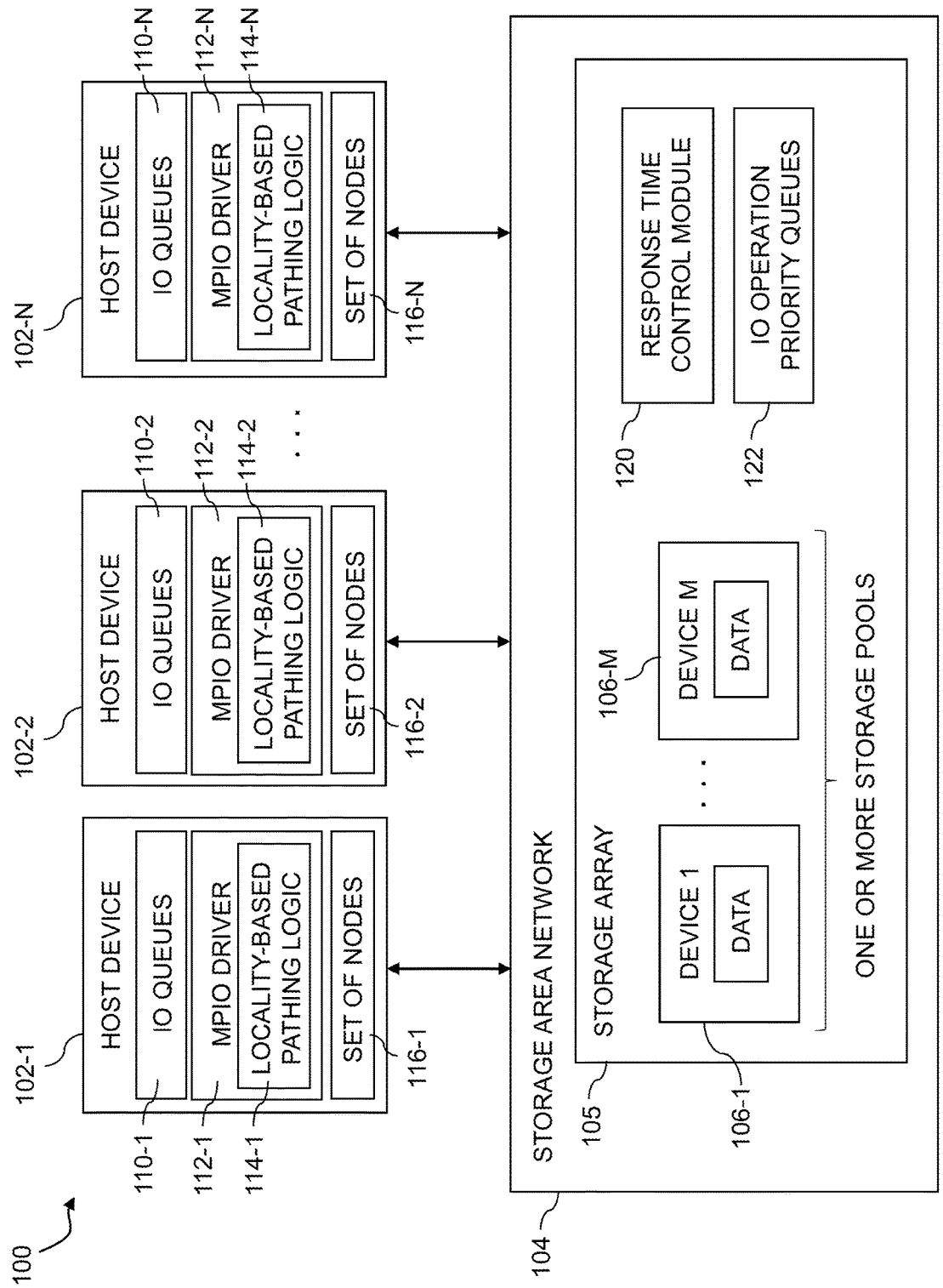
FIG. 1 is a block diagram of an information processing system configured with functionality for locality-based pathing in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 with its associated storage devices 106 is an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units or volumes (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N, respective MPIO drivers 112-1, 112-2, . . . 112-N, and respective sets of nodes 116-1, 116-2, . . . 116-N. The MPIO drivers 112 collectively comprise a multi-path layer of the host devices 102. The multi-path layer provides functionality for locality-based pathing logic 114-1, 114-2, . . . 114-N implemented within the MPIO drivers 112.

Figure 2:
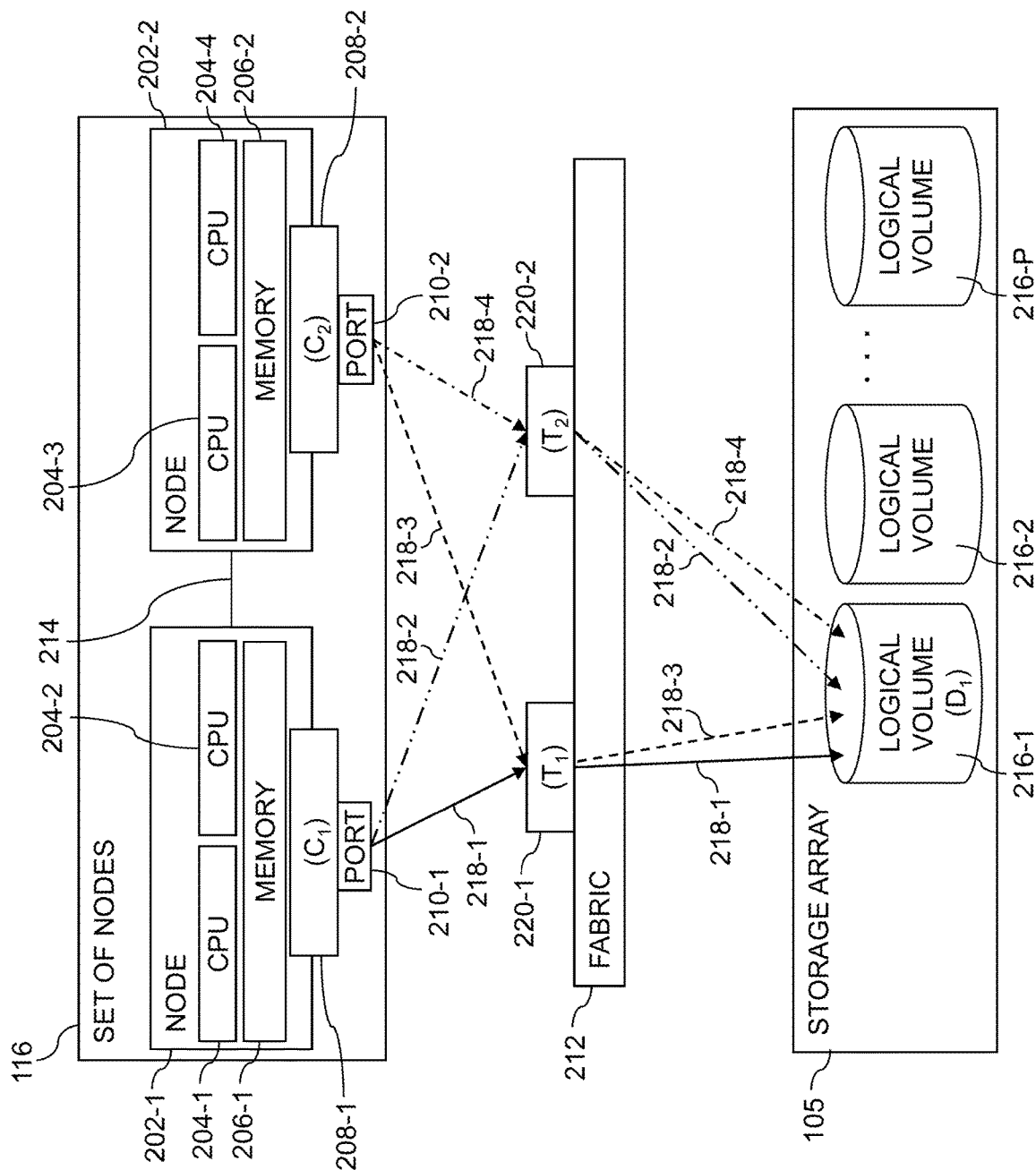
FIG. 2 is a block diagram illustrating an example implementation of a node architecture in the information processing system of FIG. 1 in an illustrative embodiment.

With reference now to FIG. 2, an example set of nodes 116 for a given host device 102 illustratively comprises a plurality of nodes 202, e.g., nodes 202-1 and 202-2 in the illustrated example. While illustrated as having two nodes 202 in the example of FIG. 2, the set of nodes 116 for a given host device 102 may alternatively comprise any other number of nodes. In some embodiments, the set of nodes 116 may implement a NUMA architecture where each node 202 is a NUMA node of the NUMA architecture.

A host device implementing a NUMA architecture includes multiple nodes. Each node comprises at least one central processing unit (CPU), memory, and at least one IO hub. The IO hub comprises at least one slot where, for example, communication adapters such as, e.g., HBAs associated with a Fibre Channel (FC), Internet Small Computer Systems Interface (iSCSI) or other communication protocols, can be connected. In some embodiments, the NUMA architecture may also comprise memory interleaved between one or more of the NUMA nodes. The interleaved memory may comprise memory that is equidistant from all of the NUMA nodes or equidistant from some of the NUMA nodes. In such a NUMA architecture, utilizing the resources local to a NUMA node will be faster, e.g., have less IO latency, as compared to the resources of another NUMA node. For example, a CPU of a given NUMA node which services an IO operation on a path that utilizes a communication adapter of another NUMA node will have increase IO latency and increased CPU utilization as compared to a path that utilizes a communication adapter of the given NUMA node. Such an increase in IO latency and CPU utilization results in reduced IO performance of the storage system.

In illustrative embodiments, for example, the nodes 202 of a given host device 102 each comprise at least one central processing unit (CPU) 204, memory 206 and at least one communication adapter 208. For example, in the embodiment illustrated in FIG. 2, node 202-1 comprises CPUs 204-1 and 204-2, memory 206-1, and communication adapter 208-1. Node 202-2 comprises CPUs 204-3 and 204-4, memory 206-2, and communication adapter 208-2. While each node 202 in the example embodiment shown in FIG. 2 is illustrated as having two CPUs 204, a memory 206, and a communication adapter 208, a given node 202 in alternative embodiments may have any other number of CPUs 204, memory 206, and communication adapters 208. In some embodiments, a given node 202 may not comprise a communication adapter 208 at all where, for example, such a given node 202 may rely on the communication adapters 208 of the other nodes 202 for communicating with the storage array 105. As mentioned above, in some embodiments, memory may also or alternatively be interleaved between the nodes 202 of the host device.

The CPUs 204 may comprise microprocessors, microcontrollers, application-specific integrated circuits (ASICs), field-programmable gate arrays (FPGAs), graphics processing units (GPUs) or other type of processing circuitry, as well as portions or combinations of such circuitry elements.

The memory 206 may comprise random access memory (RAM), read-only memory (ROM), flash memory or other types of memory, in any combination.

The communication adapters 208 may comprise, for example, HBAs or any other communication or network adapter that may be used to connect to a network such as, e.g., network fabric 212, and allow communicate between nodes 202 and storage array 105 vis the network fabric.

Each communication adapter 208 comprises a port 210 that is connected to network fabric 212. For example, communication adapter 208-1 comprises a port 210-1 and communication adapter 208-2 comprises a port 210-2. In some embodiments, the communication adapters 208 or ports 210 may comprise a PCI slot that is used to communication with the network fabric 212.

In illustrative embodiments each node 202 may comprise at least one communication pathway, referred to herein as an interconnect 214, to an adjacent node 202. For example, in the embodiment illustrated in FIG. 2, node 202-1 may be connected directly to node 202-2 via an interconnect 214. Interconnect 214 facilitates the transfer of information or other data directly between nodes 202-1 and 202-2 without relying on the bandwidth of the network fabric 212 or other communication pathways of information processing system 100. In some embodiments, each node 202 may connected to each other node 202 via an interconnect 214.

In an illustrative embodiment, each node 202 is connected to one or more adjacent nodes 202 via a respective interconnect 214. For example, for data to be transferred from a given node 202 to another node 202 that is not connected directly to the given node 202 via an interconnect 214, one or more intermediary nodes 202 and their respective associated interconnects 214 may be used.

MPIO drivers typically group all paths from a host device to a LUN into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other alive paths in the multi-path logical device.

In an illustrative embodiment, for example as seen in FIG. 2, storage array 105 comprises a plurality of logical volumes 216-1, 216-2, . . . 216-P, e.g., residing on storage devices 106-1 . . . 106-M (FIG. 1). Each communication adapter 208 communicates with a given logical volume 216 via one or more paths 218 through different portions 220, e.g., network infrastructure, of the network fabric 212. In some embodiments, a communication adapter 208 and corresponding portion 220 may together be referred to as an initiator-target (IT) nexus for a path, where I represents an initiator (e.g., communication adapter 208) and T represents a target (e.g., the portion 220 of the network fabric 212) for the path. As illustrated in FIG. 2, for example, communication adapter 208-1 (designated as $C_1$) may communicate with a target storage volume 216-1 (designated as $D_1$) via portion 220-1 (designated as $T_1$) of network fabric 212 forming a path 218-1 ($C_1T_1D_1$). Communication adapter 208-1 ($C_1$) may also communicate with storage volume 216-1 ($D_1$) via portion 220-2 (designated as $T_2$) of network fabric 212 forming a path 218-2 ($C_1T_2D_1$). Communication adapter 208-2 (designated as $C_2$) may communicate with storage volume 216-1 ($D_1$) via portion 220-1 ($T_1$) of network fabric 212 forming a path 218-3 ($C_2T_1D_1$). Communication adapter 208-2 ($C_2$) may also communicate with storage volume 216-1 ($D_1$) via portion 220-2 ($T_2$) of network fabric 212 forming a path 218-4 ($C_2T_2D_1$). Thus, in the example of FIG. 2, there are four paths, 218-1 ($C_1T_1D_1$), 218-2 ($C_1T_2D_1$), 218-3 ($C_2T_1D_1$) and 218-4 ($C_2T_2D_1$), between the set of nodes 116 of the host device 102 and the target logical volume 216-1, two for each of communication adapters 208-1 and 208-2.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of the one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

In illustrative embodiments, when an MPIO driver detects a logical volume that is connected to the storage array and generates paths to that logical volume, it may also obtain locality information associated with the communication adapters that are utilized by those paths. The locality information may, for example, comprise information indicating the node to which each communication adapter belongs and a locality of that communication adapter relative to a source node of a given path. This locality information may be stored for later use, e.g., in memory of the host device. For example, a data structure may be generated or updated with the locality information which provides the available paths on a per logical volume basis, per communication adapter basis, or on the basis of any other component of the storage system. In some embodiments, for example, the locality information may be stored in the data structure as Controller:Target:Device (CTD) entries which reflect the components of the path, e.g., the communication adapter (controller, also referred to as an initiator), storage array port (target), and storage device containing the logical volume (device).

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC of Hopkinton, Mass., suitably modified in the manner disclosed herein to implement functionality for locality-based pathing. Other types of MPIO drivers from other driver vendors may be suitably modified to incorporate functionality for locality-based pathing as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," now issued as U.S. Pat. No. 10,474,367, which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support node locality-based pathing of IO operations as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

In illustrative embodiments, the MPIO drivers 112 provide functionality for locality-based pathing of IO operations from the nodes 202 of a host device 102 to the storage array 105 using respective locality-based pathing logic 114 implemented within the MPIO drivers 112.

In some systems, a NUMA node may comprise processors, memory, and communication adapters. A NUMA node is an example of a node 202 as described above with reference to FIG. 2. NUMA affinity is a metric or indication of the relative efficiency of utilizing particular resources where, for example, the resources found within a particular NUMA node will have a high NUMA affinity for each other. For example, a processor within a particular NUMA node will have a high NUMA affinity to other resources within that NUMA node and a lower NUMA affinity to resources within another NUMA node. In some embodiments, the values found in the locality information mentioned above may comprise NUMA affinity information.

NUMA affinity may be utilized when attempting to balance IO load within an information processing system. For example, NUMA affinity may be utilized by MPIO software on top of typical load balancing techniques such as, e.g., a round robin algorithm, to drive the balancing of IO operations. For example, IO operations may be pushed to particular PCI slots based on the NUMA affinity of the processor that is handling the IO operation to those PCI slots, e.g., since they are all in the same NUMA node. However, inefficiencies and imbalances in the IO load balancing of the storage system may result where, for example, the PCI slot or slots of that NUMA node are over-loaded.

In NVMe technology, where the hardware is capable of dispatching IO operations on multiple queues simultaneously, effective and optimal load balancing becomes even more important. MPIO drivers which support multi-queue architectures may be aware of the NUMA affinity of the components of the NUMA nodes in a NUMA based architecture. Because of this, if an IO operation uses a particular processor of the NUMA node, then the memory and PCI slot of that NUMA node will typically be chosen for servicing that IO operation based on their NUMA affinity. Ideally such a technique will reduce cache misses. In cases where the PCI slot of that NUMA node is overloaded with other IO operations, however, blind reliance on NUMA affinity may result in increased latency and other inefficiencies within the system.

In illustrative embodiments, the pathing of an IO load for IO operations may be optimized by considering both locality, e.g., the latency between nodes, NUMA affinity, or other inter-node efficiency metrics, and the weight of impending IO operations on the IT nexus.

In some embodiments, IO operations may be routed to a non-node aligned hardware queue, e.g., to a communication adapter that is not part of a node 202, if the IO load on the communication adapter 208 located in a node 202 is too high.

In illustrative embodiments, a given MPIO driver 112 obtains a node topology of the set of nodes 116 of the host device 102. For example, MPIO diver 112 may determine the topology of each node 202 including, e.g., which CPUs 204, memory 206, and communication adapters 208 belong to each node 202. The MPIO driver 112 may also obtain the locality information, described above, for the set of nodes 116. In some embodiments, the locality information for a given path may be obtained by the MPIO driver 112 at a time when a logical volume associated with the given path is added to the storage array. In some embodiments, MPIO driver 112 may obtain the locality information from the data structure described above as containing locality information.

The locality information may, for example, comprise efficiency or latency information associated with each path. For example, in some embodiments, locality information may comprise latency information indicating a latency from the CPU 204 of a node 202 to the communication adapter 208 used by the path, as described above.

The MPIO driver 112 may also determine the nodes 202 and corresponding communication adapters 208 of the set of nodes 116 that may be utilized to service an IO operation. For example, the MPIO driver 112 may generate or obtain the available paths for routing IO operations from each CPU 204 to each of the logical volumes 216 of the storage array 105 via the communication adapters 208 of each of the nodes 202 and portions 220 of network fabric 214. The MPIO driver 112 may generate a mapping or other data structure that maps each CPU 204 to each communication adapter 208 as part of the available paths that may be utilized to dispatch IO operations to the logical volumes 216 of the storage array 105. In some embodiments, the mapping may also comprise the locality information associated with each communication pathway that corresponds to the CPUs 204 and communication adapters 208 of each path.

In an illustrative embodiment, when an MPIO driver 112 obtains an IO operation that targets a given logical volume 216 from an IO queue 110, the MPIO driver determines which path will be used to dispatch the IO operation to the storage array 105. In illustrative embodiments, the MPIO driver 112 utilizes locality-based pathing logic 114 to determine which path will be used for that IO operation.

In illustrative embodiments, locality-based pathing logic 114 may determine the source CPU 204 and node 202 from which the IO operation has originated or that will be servicing the IO operation for the host device 102. For example, the IO operation, or information associated with the IO operation, may comprise an indication of the source CPU 204. In some embodiments, for example, the IO operation, or information associated with the IO operation, may comprise a CPU identifier (ID) that may be used to identify the source CPU 204 and thus the node 202 containing the source CPU 204.

With the source CPU 204 identified, locality-based pathing logic 114 determines each path that may be used to dispatch the IO operation from the source CPU 204 to the target logical volume 216. For example, with reference again to FIG. 2, an example set of the available paths to a given logical volume 216-1 that originate at a given CPU 204-1 (and thus node 202-1) may comprise a first path 218-1 ($C_1T_1D_1$) which utilizes communication adapter 208-1 of node 202-1 and portion 220-1 of the network fabric 212, a second path 218-2 ($C_1T_2D_1$) which utilizes communication adapter 208-1 of node 202-1 and portion 220-2 of the network fabric 212, a third path 218-3 ($C_2T_1D_1$) which utilizes communication adapter 208-2 of node 202-2, e.g., via interconnect 214, and portion 220-1 of the network fabric 212 and a fourth path 218-4 ($C_2T_2D_1$) which utilizes communication adapter 208-2 of node 202-2, e.g., via interconnect 214, and portion 220-2 of the network fabric 212. Any other number of paths may also or alternatively be available that utilize the communication adapters 208 of any other nodes 202.

CPU 204-1 and CPU 204-2 are local to communication adapter 208-1 of node 202-1 and CPU 204-3 and CPU 204-4 are local to the communication adapter 208-2 of node 202-2. Because of this locality, any paths that are being processed by CPU 204-1 and CPU 204-2 that utilize communication adapter 208-1 are local to node 202-1 and any paths that are being processed by CPU 204-3 and CPU 204-4 that utilize communication adapter 208-2 are local to node 202-2.

In some embodiments, locality-based pathing logic 114 may obtain the locality information associated with each path. For example, in some embodiments, the locality information may comprise an entry for each available path and each entry may comprise a respective latency associated with communication between the source CPU 204 of the source node 202 and the communication adapter 208 for the that path. In illustrative embodiments, for example, the locality information for each available path may be obtained based at least in part on the above described data structure of locality information.

In illustrative embodiments, locality-based pathing logic 114 determines a dynamic weight for each path based at least in part on the locality information. For example, in some embodiments locality-based pathing logic 114 may obtain the node information of the CPU that is currently processing the IO operation, may obtain the locality information for the paths, for example, by accessing the locality information data structure described above, and may determine a locality-based weight for each path based at least in part on the locality information.

In an example scenario, with reference to FIG. 2, an example system comprises node 202-1 and node 202-2, as described above. As mentioned above, four paths are available for communication between the host device 102 and storage array 105, i.e., the first path 218-1 ($C_1T_1D_1$), the second path 218-2 ($C_1T_2D_1$), the third path 218-3 ($C_2T_1D_1$), and the fourth path 218-4 ($C_2T_2D_1$). If an IO operation is being serviced by CPU 204-1 of node 202-1, the locality-based pathing logic 114 determines the locality weight for each path from the perspective of node 202-1 based at least in part on the locality information. For example, for each path that utilizes the communication adapter 208-1 ($C_1$) of node 202-1, i.e., first path 218-1 ($C_1T_1D_1$) and the second path 218-2 ($C_1T_2D_1$), a value of 1 may be used for the locality weight. For each path that utilizes the communication adapter 208-2 ($C_2$) of node 202-2, i.e., the third path 218-3 ($C_2T_1D_1$) and the fourth path 218-4 ($C_2T_2D_1$), a value of 4 may be used since the CPU 204-1 is not local to communication adapter 208-2 ($C_2$). Any other value may be used for the weight of the non-local paths so long as the value is greater than the value used for the local paths.

In some embodiments, the greater the latency between a CPU 204 and communication adapter 208, the greater the locality weight of a corresponding path. For example, in a scenario where the host device 102 comprises a third node that is not directly connected to node 202-1 but instead has node 202-2 as an intermediary node, a path from CPU 204-1 of node 202-1 that utilizes a communication adapter of the third node would have a greater locality weight value than a path from CPU 204-1 of node 202-1 that utilizes the communication adapter 208-2 ($C_2$) of node 202-2. For example, the greater locality weight value may be due to the increased latency between the CPU 204-1 of node 202-1 and the communication adapter of the third node. For example, in the example scenario above, a value of 8 or any other value greater than the locality weight value associated with the paths from CPU 204-1 of node 202-1 that utilize the communication adapter 208-2 ($C_2$) of node 202-2 may be assigned to a path from CPU 204-1 of node 202-1 to the communication adapter of the third node. Example locality weights for the first path 218-1 ($C_1T_1D_1$), the second path 218-2 ($C_1T_2D_1$), the third path 218-3 ($C_2T_1D_1$) and the fourth path 218-4 ($C_2T_2D_1$) with respect to an IO operation being serviced by a given CPU are illustrated in Table 1 below.

TABLE 1

|  | $C_1T_1D_1$ | $C_1T_2D_1$ | $C_2T_1D_1$ | $C_2T_2D_1$ |
| --- | --- | --- | --- | --- |
| CPU 202-1 | 1 | 1 | 4 | 4 |
| CPU 202-2 | 1 | 1 | 4 | 4 |
| CPU 202-3 | 4 | 4 | 1 | 1 |
| CPU 202-4 | 4 | 4 | 1 | 1 |

In illustrative embodiments, for example, the locality-based pathing logic 114 selects the path for delivering the IO operation to the storage volume based on the values of the locality weights found in Table 1. For example, the locality-based pathing logic 114 may select the path that has the minimal locality weight, e.g., the first path 218-1 ($C_1T_1D_1$) or the second path 218-2 ($C_1T_2D_1$) in the example where the source CPU is CPU 204-1. If more than one path has the minimal locality weight, the locality-based pathing logic 114 may select either path.

In an example scenario, where the node 202 in which an IO operation is being processed does not comprise a communication adapter, the locality-based pathing logic 114 may select a path that utilizes a communication adapter 208 of another node 202 based on the locality weights between the nodes 202 for each path in the manner described above.

In some embodiments, the locality information may be used to determine locality weights relative to a node 202 or other location in which the data payload for the IO operation is stored, e.g., in random-access memory (RAM) where, for example, since a direct memory access (DMA) transfer can be easily setup between the local RAM and the local communication adapter 208. For example, where node 202-1 comprises a CPU 204-1 that is servicing the IO operation and the memory 206-2 of node 202-2 or an interleaved memory comprises the data payload, the locality weight may be determined based at least in part on the location of the data payload instead of the CPU that is servicing the IO operation. For example, in such a scenario, an IO operation being serviced by CPU 204-1 of node 202-1 which has its data payload stored in memory 206-2 of node 202-2, will have a lower weight for those paths that utilize communication adapter 208-2 of node 202-2 than those that utilize communication adapter 208-1 of node 202-1 even though the CPU 204-1 is local to communication adapter 208-1. For example, paths that utilize communication adapter 208-2 may have a value of 1 while paths that utilize communication adapter 208-2 may have a value or 4.

In some embodiments, the weight of each path may be determined based at least in part on both the locality of the CPU 204 that is servicing an IO operation to a given communication adapter 208 and the locality of the memory 206 storing the data payload for that IO operation to the given communication adapter 208. For example, the weights described above for the locality of the CPU 204 servicing the IO operation and the locality of the memory 206 storing the data payload may be aggregated or otherwise combined to form a combined weight that takes into account both localities relative to a given communication adapter 208. For example, where the node 202 comprising the CPU 204 that is servicing the IO operation and the node 202 comprising the memory 206 that stores the data payload for the IO operation are separated by one or more intermediary nodes 202 comprising communication adapters 208, a path that utilizes the communication adapter 208 of one of the intermediary nodes 202 may comprise the lowest combined weight based at least in part on the locality information for the localities of each of the CPU 204 and memory 206.

In illustrative embodiments, the locality-based pathing logic 114 may determine an adaptive weight for a given path according to equation (1) below:

Adaptive weight of a path=weight of impending IO operations on IT nexus+locality weight of path    (1)

The weight of impending IO operations on the IT nexus for a given path may be determined by the locality-based pathing logic 114, for example, based at least in part on a number of IO operations pending in the IO queues of the IT nexus, e.g., the IO queues of the corresponding communication adapter 208 of the given path. In some embodiments, a type of the pending IO operations may also factor into the weight of the impending IO operations on the IT nexus where, for example, write IO operations may comprise a smaller weight than read IO operations as they may be considered more important to the system. Any other factor may be used for determining a weight value for the IT nexus based on the type of pending IO operations.

In illustrative embodiments, the weight of impending IO operations on the IT nexus for each available path may comprise a value based at least in part on the IO load for the communication adapter 208 utilized in that path. In some embodiments, the weight of impending IO operations on the IT nexus for each available path may comprise a value based at least in part on the IO load for the portion 220 of the network fabric 212 utilized in that path. In some embodiments, the weight of impending IO operations on the IT nexus for each available path may comprise a value based at least in part on the IO load for both the communication adapter 208 and the portion 220 of the network fabric 212 that are utilized in that path. In some embodiments, the weight of impending IO operations on the IT nexus for each available path may comprise a value based at least in part on the IO load on any portion of the path including, for example, the IO load on the communication adapter 208, the IO load on the portion 220 of the network fabric 212, and the IO load on any other portion of the path including the interface with the storage array 105. In illustrative embodiments, the larger the number of IO blocks pending along the path, the greater the value of the weight of impending IO operations on the IT nexus for the path.

In an example embodiment, the determined IO loads may be normalized to a particular range to generate the weight of impending IO operations on the IT nexus. In an example embodiment, the range of the weight of impending IO operations on the IT nexus may comprise 0 to 100 and the IO loads may be normalized to fit in this range. As an example, path 218-1 may have 850 IO blocks pending which may be normalized to a weight value of 85 (850×0.1), path 218-2 may have 350 IO blocks pending which may be normalized to a weight value of 35 (350×0.1), path 218-3 may have 500 blocks pending which may be normalized to a weight value of 50 (500×0.1), and path 218-4 may have 150 IO blocks pending which may be normalized to a weight value of 15 (150×0.1). Any other range of values and normalization may be utilized depending on the specific attributes of the system. In alternative embodiments no normalization may be used and the IO load of each component may be used as is in the weight of impending IO operations on the IT nexus.

The locality weight of the given path may be determined, for example, as described above, e.g., based at least in part on the locality of the source CPU 204 to the communication adapter 208 of the given path, based at least in part on the locality of a memory 206 storing the data payload for the IO operation to the communication adapter 208 of the given path, or combinations thereof.

By combining the weight value for the IT nexus utilized by a given path along with the locality weight corresponding to the given path, an adaptive weight for the given path may be determined which may be utilized by the locality-based pathing logic 114 to select a path for servicing the IO operation. For example, in some embodiments, the path having the smallest adaptive weight may be selected by the locality-based pathing logic 114 for servicing an IO operation.

In illustrative embodiments, if the host device 102 does not implement a node-based architecture, such as a NUMA architecture, the locality weight of a path may be set to 1 such that load balancing across the paths may be performed according to conventional techniques.

While locality-based pathing logic 114 is described above with respect to the nodes of a single host device, in some embodiments, the nodes of any number of host devices may be used where, for example, a given path from a given CPU 204 to a given logical volume 216 may utilize a communication adapter 208 associated with a node 202 of a host device 102 that is different than the host device 102 that contains the given CPU 204.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112, locality-based pathing logic 114 and sets of nodes 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 3:
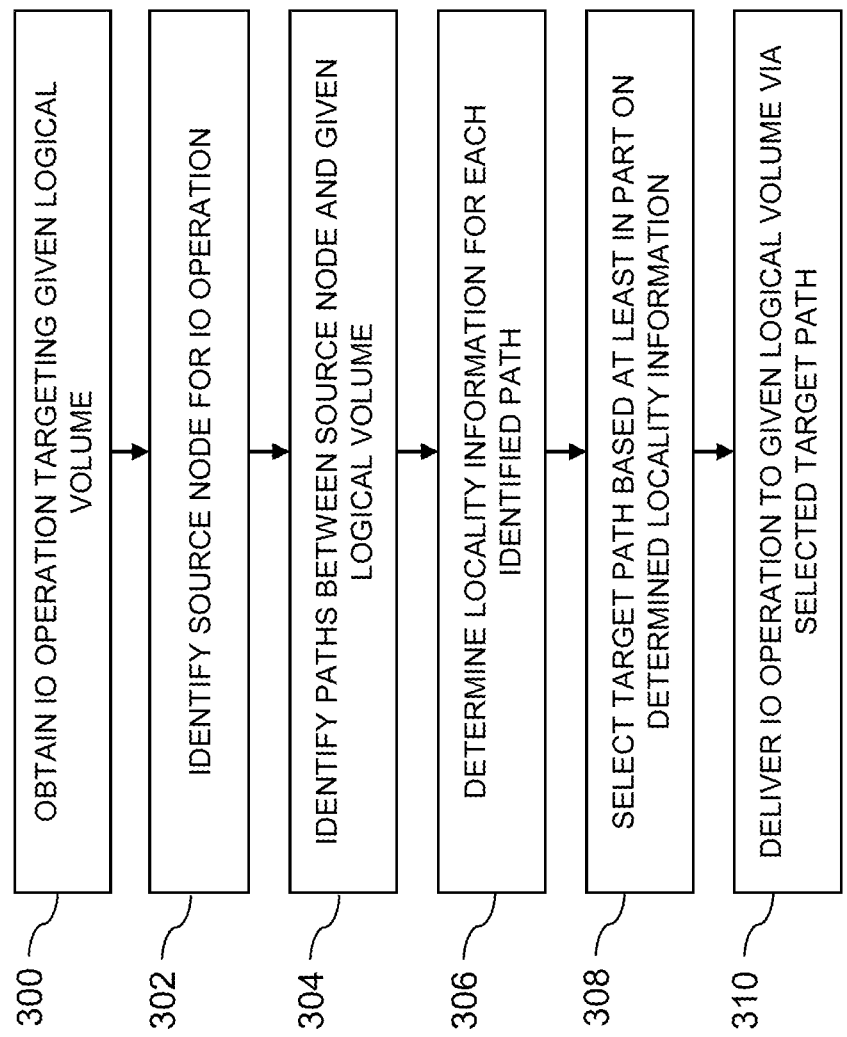
FIG. 3 is a flow diagram of an example process for locality-based pathing in an illustrative embodiment.

Illustrative embodiments of the techniques and functionality of locality-based pathing logic 114 will now be described in more detail with reference to the flow diagram of FIG. 3. FIG. 3 provides an example process that is implemented by locality-based pathing logic 114 to select a path for delivering an IO operation to a given logical volume that takes into account the locality of the communication adapter used by that path to the CPU processing the IO operation.

The process as shown in FIG. 3 includes steps 300 through 310, and is suitable for use in the system 100 but is more generally applicable to other types of systems comprising multiple host devices and a shared storage system.

At 300, the MPIO driver 112 obtains an IO operation from the IO queue 110 of its host device 102. The IO operation targets a given logical volume of the storage array 105, e.g., logical volume 216-1.

At 302, locality-based pathing logic 114 identifies the source node 202 for the IO operation. For example, in some embodiments, the locality-based pathing logic 114 may obtain a CPU ID associated with the IO operation to determine a CPU 204 that is processing the IO operation. In some embodiments, the identified source node 202 will be the source node 202 containing the CPU 204 corresponding to the CPU ID. In some embodiments, the locality-based pathing logic 114 may obtain information associated with the IO operation which indicates a memory 206 in which a data payload associated with the IO operation is stored. In some embodiments, the identified source node 202 will be the source node 202 containing the memory 206 storing the data payload associated with the IO operation. In some embodiments, multiple source nodes 202 may be taken into account where, for example, a CPU 204 of a first source node is identified as processing the IO operation while the memory 206 of a second source node is identified as storing the data payload associated with the IO operation. In such a scenario, the locality information for one or both of the source nodes may be taken into account when selecting a path.

At 304, locality-based pathing logic 114 identifies the available paths between the source node 202 and the given logical volume, e.g., one or more of the paths 218 in the example of FIG. 2.

At 306, locality-based pathing logic 114 determines the locality information for each path. For example, locality-based pathing logic 114 may determine the locality information based on a latency between the source CPU 204 (or memory 206) and a communication adapter 208 used by a given path, as described above. In some embodiments, the locality information may be obtained from a data structure. For example, the locality information may be determined during a startup or initialization of the host device, or when a logical volume is added to the storage array, and may be stored in the data structure for later use by locality-based pathing logic 114.

At 308, locality-based pathing logic 114 selects a target path based at least in part on the determined locality information. For example, locality-based pathing logic 114 may select the path that has a minimum value, e.g., latency, of the locality information among the available paths. In some embodiments, another path may be selected based at least in part on the locality information other than the path having the minimum value. For example, the path having the second lowest value, or any other path may be selected.

At 310, locality-based pathing logic 114 delivers the IO operation to the given logical volume via the selected target path.

Separate instances of the process of FIG. 3 may be performed in respective additional host devices that share the storage array.

The particular processing operations and other system functionality described in conjunction with the flow diagram of FIG. 3 is presented by way of illustrative example only, and should not be construed as limiting the scope of the disclosure in any way. Alternative embodiments can use other types of processing operations involving host devices, storage systems and locality-based pathing logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different locality-based pathing logic arrangements within a given information processing system.

Functionality such as that described in conjunction with the flow diagram of FIG. 3 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for locality-based pathing are carried out at least in part under the control of its locality-based pathing logic 114. For example, locality-based pathing logic 114 is illustratively configured to control performance of portions of the process shown in the flow diagram described above in conjunction with FIG. 3.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for locality-based pathing. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support locality-based pathing.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for locality-based pathing as disclosed herein, IO load balancing in node-based architectures such as, e.g., a NUMA architecture, may be inefficient since the loads will typically be sent to those communication adapters with the highest affinity to the source CPU, i.e., the communication adapters found in the same node, even when that communication adapter is overloaded with pending IO operations.

Such drawbacks are advantageously overcome in illustrative embodiments herein by utilization of locality-based pathing logic 114 to implement functionality for locality-based pathing as described above. For example, by selecting the target path as a function of a weight of the impending IO operations on the IT nexus of each path and the locality of the source CPU to the communication adapter of each path, the path having the best combination of available throughput and latency may be utilized to maximize efficiency in the system. This allows an underutilized communication adapter to be taken advantage of by the MPIO driver even when the latency to that underutilized communication adapter may be greater than the latency to a local communication adapter since the difference in latency may be offset by the additional time that the IO blocks of the IO operation would wait in the queue for the local communication adapter, which results in better IO throughput and lower latency overall in the system.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the locality-based pathing logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, locality-based pathing logic, sets of nodes and additional or alternative components. Also, the particular configurations of system and device elements and associated processing operations illustratively shown in the drawings can be varied in other embodiments. For example, a wide variety of different MPIO driver configurations and associated locality-based pathing logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a host device configured to communicate over a network with a storage system comprising a plurality of storage devices;
   the host device comprising:
   a plurality of nodes each comprising at least one processing device, memory coupled to the at least one processing device and at least one communication adapter, each node being connected to at least one adjacent node by an interconnect communication pathway;
   a multi-path input-output driver configured to deliver input-output operations from the host device to the storage system over the network,
   wherein the multi-path input-output driver is further configured:
   to obtain an input-output operation that targets a given logical volume of the storage system;
   to identify a source node among the plurality of nodes for the input-output operation based at least in part on information associated with the input-output operation;
   to identify a plurality of paths between the source node and the given logical volume via the communication adapters of the plurality of nodes, at least one of the plurality of paths between the source node and the given logical volume comprising the communication adapter of a node of the plurality of nodes other than the source node;
   to determine locality information for each identified path;
   to select a target path from the identified paths based at least in part on the determined locality information for each identified path; and
   to deliver the obtained input-output operation to the given logical volume via the selected target path.

2. The apparatus of claim 1 wherein the plurality of nodes comprise non-uniform memory access (NUMA) nodes.

3. The apparatus of claim 1 wherein the locality information for each identified path is determined based at least in part on a latency between a processor of the source node and the corresponding communication adapter for that identified path.

4. The apparatus of claim 1 wherein the locality information for each identified path is determined based at least in part on a latency between a memory storing a data payload associated with the obtained input-output operation and the corresponding communication adapter for that identified path.

5. The apparatus of claim 1 wherein the multi-path input-output driver is further configured to determine a pending input-output load on each identified path and wherein selecting the target path from the identified paths based at least in part on the determined locality information for each identified path comprises selecting the target path from the identified paths based at least in part on the determined locality information for each identified path and the determined pending input-output load on each identified path.

6. The apparatus of claim 5 wherein the multi-path input-output driver is further configured to determine a weight for each identified path based at least in part on a sum of the determined locality information for that identified path and the determined pending input-output load on that identified path and wherein selecting the target path from the identified paths based at least in part on the determined locality information for each identified path and the determined pending input-output load on each identified path comprises selecting the target path from the identified paths based at least in part on the determined weight.

7. The apparatus of claim 6 wherein selecting the target path from the identified paths based at least in part on the determined weight comprises selecting the path from the identified paths that has a minimum weight as the target path.

8. A method comprising:
obtaining, by a multi-path input-output driver of a host device configured to communicate over a network with a storage system comprising a plurality of storage devices, an input-output operation that targets a given logical volume of the storage system;
identifying, by the multi-path input-output driver, a source node among a plurality of nodes of the host device for the input-output operation based at least in part on information associated with the input-output operation, the plurality of nodes each comprising at least one processing device, memory coupled to the at least one processing device and at least one communication adapter, each node being connected to at least one adjacent node by an interconnect communication pathway; and
identifying, by the multi-path input-output driver, a plurality of paths between the source node and the given logical volume via the communication adapters of the plurality of nodes, at least one of the plurality of paths between the source node and the given logical volume comprising the communication adapter of a node of the plurality of nodes other than the source node;
determining, by the multi-path input-output driver, locality information for each identified path;
selecting, by the multi-path input-output driver, a target path from the identified paths based at least in part on the determined locality information for each identified path; and
delivering, by the multi-path input-output driver, the obtained input-output operation to the given logical volume via the selected target path;
wherein the host device comprises a processor coupled to a memory.

9. The method of claim 8 wherein the plurality of nodes comprise non-uniform memory access (NUMA) nodes.

10. The method of claim 8 wherein the locality information for each identified path is determined based at least in part on a latency between a processor of the source node and the corresponding communication adapter for that identified path.

11. The method of claim 8 wherein the locality information for each identified path is determined based at least in part on a latency between a memory storing a data payload associated with the obtained input-output operation and the corresponding communication adapter for that identified path.

12. The method of claim 8 wherein the method further comprises determining a pending input-output load on each identified path and wherein selecting the target path from the identified paths based at least in part on the determined locality information for each identified path comprises selecting the target path from the identified paths based at least in part on the determined locality information for each identified path and the determined pending input-output load on each identified path.

13. The method of claim 12 wherein the method further comprises determining a weight for each identified path based at least in part on a sum of the determined locality information for that identified path and the determined pending input-output load on that identified path and wherein selecting the target path from the identified paths based at least in part on the determined locality information for each identified path and the determined pending input-output load on each identified path comprises selecting the target path from the identified paths based at least in part on the determined weight.

14. The method of claim 13 wherein selecting the target path from the identified paths based at least in part on the determined weight comprises selecting the path from the identified paths that has a minimum weight as the target path.

15. A computer program product comprising a non-transitory processor-readable storage medium having stored therein program code of one or more software programs, wherein the program code, when executed by a host device comprising a plurality of nodes and a multi-path input-output driver, each node of the plurality of nodes comprising at least one processing device, memory coupled to the at least one processing device and at least one communication adapter, each node being connected to at least one adjacent node by an interconnect communication pathway, the host device being configured to communicate over a network with a storage system comprising a plurality of storage devices, causes the multi-path input-output driver:
to obtain an input-output operation that targets a given logical volume of the storage system;
to identify a source node among the plurality of nodes for the input-output operation based at least in part on information associated with the input-output operation;
to identify a plurality of paths between the source node and the given logical volume via the communication adapters of the plurality of nodes, at least one of the plurality of paths between the source node and the given logical volume comprising the communication adapter of a node of the plurality of nodes other than the source node;
to determine locality information for each identified path;
to select a target path from the identified paths based at least in part on the determined locality information for each identified path; and
to deliver the obtained input-output operation to the given logical volume via the selected target path.

16. The computer program product of claim 15 wherein the plurality of nodes comprise non-uniform memory access (NUMA) nodes.

17. The computer program product of claim 15 wherein the locality information for each identified path is determined based at least in part on a latency between a processor of the source node and the corresponding communication adapter for that identified path.

18. The computer program product of claim 15 wherein the locality information for each identified path is determined based at least in part on a latency between a memory storing a data payload associated and the obtained input-output operation and the corresponding communication adapter for that identified path.

19. The computer program product of claim 15 wherein the program code, when executed by the host device, further causes the multi-path input-output driver to determine a pending input-output load on each identified path and wherein selecting the target path from the identified paths based at least in part on the determined locality information for each identified path comprises selecting the target path from the identified paths based at least in part on the determined locality information for each identified path and the determined pending input-output load on each identified path.

20. The computer program product of claim 19 wherein the program code, when executed by the host device, further causes the multi-path input-output driver to determine a weight for each identified path based at least in part on a sum of the determined locality information for that identified path and the determined pending input-output load on that identified path and wherein selecting the target path from the identified paths based at least in part on the determined locality information for each identified path and the determined pending input-output load on each identified path comprises selecting the target path from the identified paths based at least in part on the determined weight.

* * * * *